United States Patent [19]

Chisolm

[11] 4,289,562

[45] Sep. 15, 1981

[54] CASE LABELER

[76] Inventor: Sherril H. Chisolm, 5919 Southwest Ave., St. Louis, Mo. 63139

[21] Appl. No.: 165,931

[22] Filed: Jul. 2, 1980

[51] Int. Cl.$^3$ .............................................. B32B 31/00

[52] U.S. Cl. .................................... 156/364; 118/243; 156/357; 156/567; 156/568; 156/571; 156/DIG. 29; 156/DIG. 31; 156/578

[58] Field of Search ............... 156/350, 351, 361, 364, 156/566–572, 578, DIG. 29, DIG. 31; 118/243, 263

[56] References Cited

U.S. PATENT DOCUMENTS

| | | | |
|---|---|---|---|
| 1,006,231 | 11/1912 | Sague | 118/243 X |
| 1,158,787 | 11/1915 | Coates | 156/568 |
| 1,448,364 | 3/1923 | Peters et al. | 156/367 |
| 2,109,590 | 3/1938 | Kimball | 101/35 |
| 2,503,799 | 4/1950 | Carter | 118/243 X |
| 3,005,744 | 10/1961 | McFarlane | 156/566 |
| 3,984,279 | 10/1976 | Siryj | 156/556 |
| 4,032,388 | 6/1977 | Dunning | 156/567 X |

*Primary Examiner*—David A. Simmons
*Attorney, Agent, or Firm*—Gravely, Lieder & Woodruff

[57] ABSTRACT

A case labeler for moving a label from a holding magazine in a path to sweep over a glue applying applicator and continue into a position where the glue side of the label is presented to a case moving on a conveyor and acting to trip control switches which cause the glue applicator to move into the sweep path of the label and cause a label carrier head to pick a label off the magazine by negative pressure and begin a sweeping motion in a well defined path. The motion of the carrier head in its sweep path is to rotate the label from a first position at the magazine through a partial amount of rotation to pass the label surface over the applicator and through the remainder of the rotation to present the glue side of the label to the path of case movement. The case labeler includes an applicator which is free to move in a manner such that it may apply glue substantially uniformly over the label surface as the head carries the label in a continuous sweep between the magazine and the path of conveyance for the cases.

7 Claims, 7 Drawing Figures

CASE LABELER

BACKGROUND OF THE INVENTION

1. Field of the Invention

This invention pertains to case labeling apparatus, and is particularly concerned with moving labels past a glue or adhesive applying station to a position in the path of conveyance of cases for application of the labels to a surface of moving cases.

2. Description of the Prior Art

It is known in label applying apparatus to provide a supply of labels, to pick labels one at a time from the supply, apply an adhesive to the label, and then deliver the label to an object, such as a carton or container, where the label is released as the adhesive causes it to cling to the object. Examples of label applying apparatus are found in Peters et al U.S. Pat. No. 1,448,364 of Mar. 13, 1923; McFarlane No. 3,005,744 of Oct. 24, 1961; and Siryj No. 3,984,279 of Oct. 5, 1976. These examples employ complicated reciprocating mechanisms for moving labels and timing the application of the labels to the presence of the object to be labeled. Other examples of rotary label applying apparatus are Coates U.S. Pat. No. 1,158,787 of Nov. 2, 1915; and Dunning No. 4,032,388 to June 28, 1977.

SUMMARY OF THE INVENTION

The present invention is directed to case labelers in which the apparatus is set in motion only when a case or object is moved into a position where a label may be applied. The apparatus is arranged with a quick acting swing arm carrying a label pickup head movable between a label magazine and the position presenting the label to the case. In the movement of the pickup head between the foregoing positions, the label is caused to move over a glue applying roller, and the roller is supported so it may adapt to the attitude of the label during its passage. Controls are provided for moving the pickup head in proper sequence, for controlling the delivery of adhesive, for applying vacuum to the pickup head while the label is being moved from the supply magazine and releasing the vacuum at the position where the label is presented against the case.

The invention is also directed to case labeler apparatus in which a carrier for moving labels from a supply magazine to a position presenting the label to a case moving into the label is moved in a circular path which presents the label to a glue applicator roll, and to means for permitting the roll to assume positions in which it responds to the angle of approach and passage of the label carrier such that glue is applied in a substantially uniform film or strips.

A preferred embodiment of the present invention comprises a frame adjacent the path of movement of cases; a label supporting head; a magazine for supporting a supply of labels; adhesive supply means having an applicator member for transferring adhesive from said supply to the labels; operating means connected to said head for moving said head in a path from said magazine and past said applicator member into a position in the path of movement of a case; vacuum generating means connected to said head for permitting said head to engage and pull a label out of said magazine and retain label engagement past said adhesive applicator member and into a position in the path of a case; and control means operatively connected to said operating means and said vacuum generating means and including first means responsive to the approach of a case for energizing said operating means to effect movement of said head between said magazine and a position in the path of case movement, and second means responsive to the advance of a case to the position of said head in the case path for ending the generation of vacuum so the label is released to the case and adhesively secured thereto and causing said operating means to return said head to said magazine.

Further, the preferred embodiment includes a label glue applicator in which a glue pickup roll is supported by independently movable arms adjacent the path of movement of a label to apply the glue to the exposed surface of the label, and in which the independently movable arms allow the glue applicator roll to conform its position to that of the surface of the label to the extent that the arm can yield unevenly and allow the roll to follow the angular position of the label, whereby a substantially uniform film of glue or strips of glue is applied.

DETAILED DESCRIPTION OF THE EMBODIMENT

Figure 1:
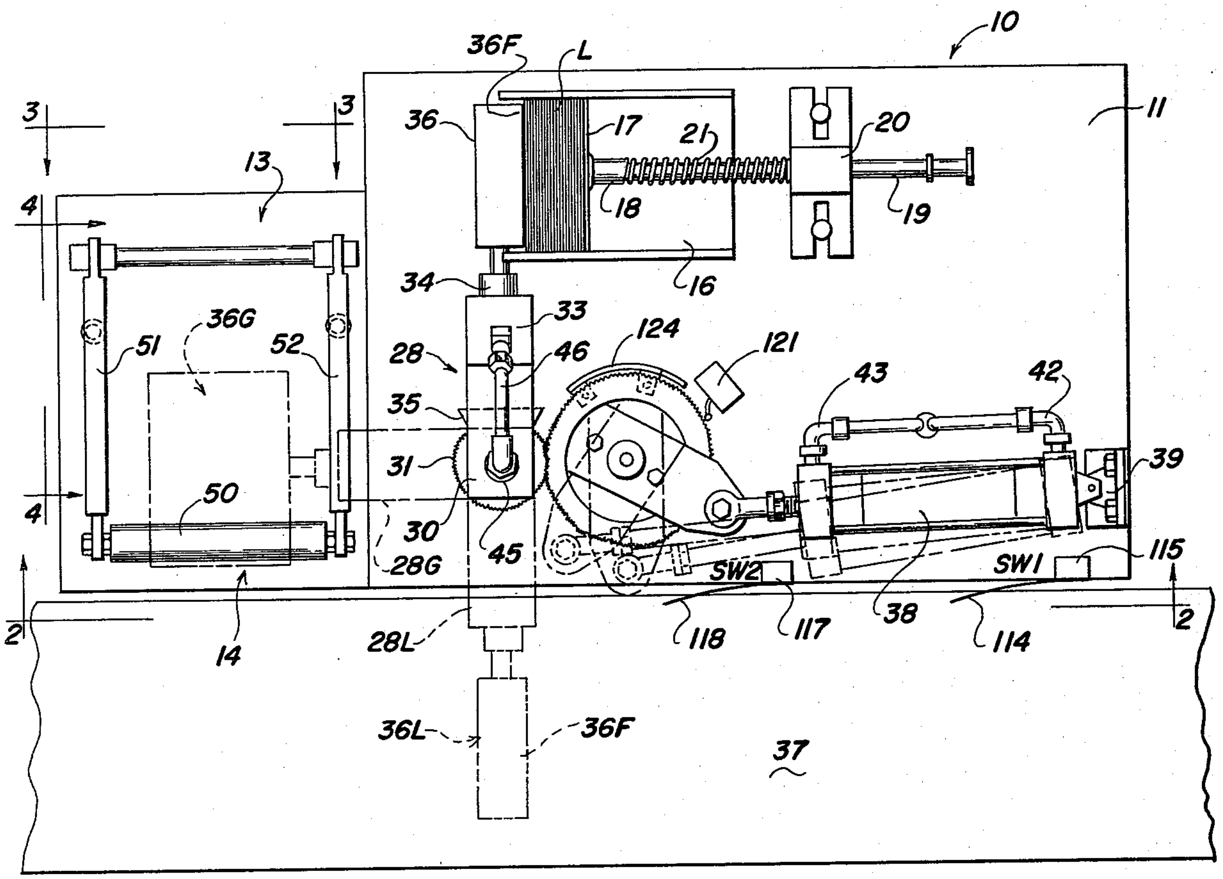
FIG. 1 is in the drawings is a top plan view of the case labeler assembly showing the mechanism for moving labels from a supply magazine past an adhesive applicator to a position in the path of travel of cases.
Figure 2:
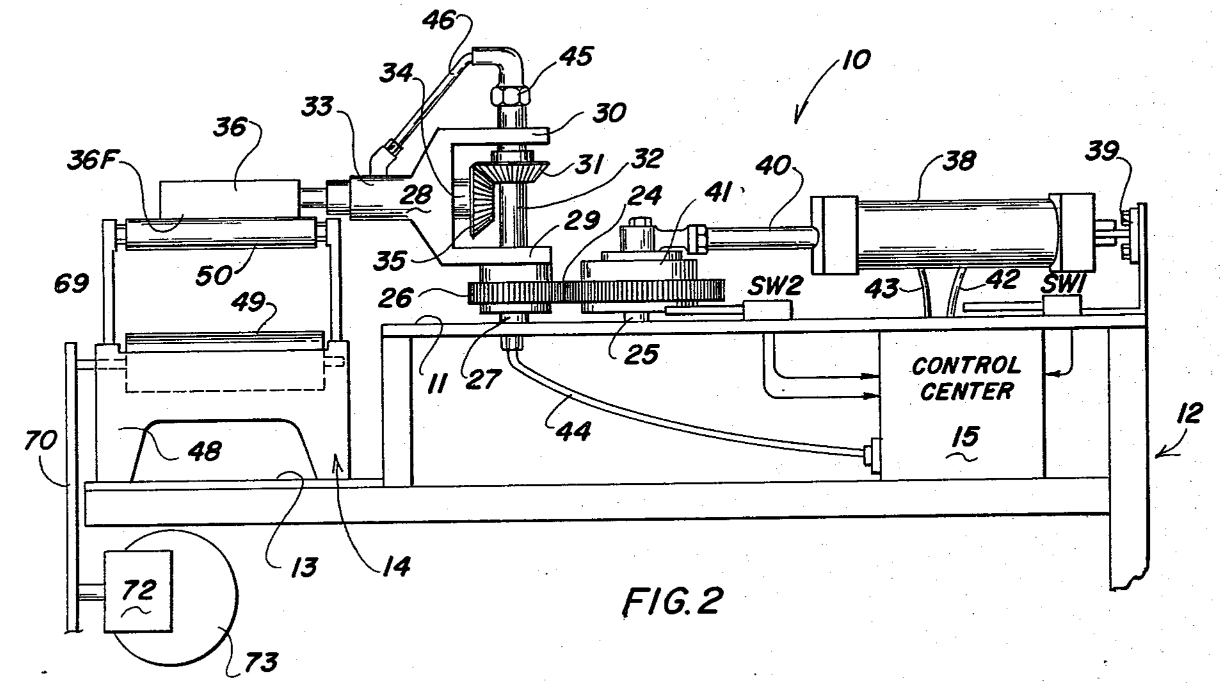
FIG. 2 is a longitudinal side elevation view taken along line 2—2 in FIG. 1, and showing the label pickup head at the adhesive applicator position.

In FIGS. 1 and 2, the case labeler assembly 10 includes a platform 11 presenting an upper surface for operating components. The platform is carried by suitable sub-frame structure 12 on which a second platform 13 (FIG. 1) is arranged for the purpose of supporting the adhesive or glue supply assembly 14. A number of control means are mounted in a control center 15.

The operating components comprise a label magazine frame 16 supporting a stack of labels L set in a vertical position with the printed side outermost. The blank sides of the labels L are engaged by an advancing plate 17 mounted at the end 18 of a guide rod 19. The guide rod 19 passes through a support block 20 fastened to the platform 11. A spring 21 encircles the guide rod 19 and has one end pressed against the block 20 and the other end pressed against the rod end 18. The spring 21 maintains a light but steady pressure on the stack of labels to maintain the foremost label of the stack at the exit end of the frame 16 where it can be extracted as needed.

The mechanism for picking and presenting labels to the cases comprises a drive gear 24 supported on a shaft 25 on platform 11. A driven gear 26, also supported on shaft 27 on platform 11, meshes with the drive gear 24. The driven gear shaft 27 is fixed and is hollow for a reason to be explained. A yoke member 28 has one arm 29 fastened to gear 26, while the other arm 30 is rotatably supported on the adjacent upper end of the hollow shaft 27. A first bevel gear 31 is fixed to a part 32 of fixed shaft 27 so it does not rotate. The yoke 28 is formed with an arm 33 which carries a shaft 34 on which a second bevel gear 35 is fastened. The shaft 34 passes through arm 33 and supports a label pickup head 36. As seen in FIGS. 1 and 2, the rotation of drive gear 24 rotates driven gear 26, and gear 26 swings the yoke 28 from the full-line position 28 of FIG. 1 where the label pickup head 36 is at the label magazine frame 16, through the phantom position 28G where the pickup head is located at position 36G, to the phantom position 28L where the pickup head is located at the label release position 36L. During the swing of the yoke 28, the bevel gear 35 rolls on the fixed bevel gear 31, thereby rotating shaft 34. It is seen that the shaft 34 starts (FIG. 1) with the label pickup head 36 in a substantially vertical position 28 with its label receiving and supporting face 36F presented flatwise against the labels. As the yoke 28 swings into position 28G, the head has been rotated into a substantially horizontal position face down (FIG. 2). Continued swing of yoke 28 into position 28L causes the head to rotate into a position (FIG. 1) where its face 36F is substantially vertical and presented to the cases (not shown) moved leftwardly on a suitable conveying means 37.

The means for operating drive gear 24 includes an air cylinder 38 having its base end pivotally mounted in a suitable bracket 39. The opposite end supports the piston rod 40 which is pivotally connected to an arm 41 fixed on gear 24. The several moved positions of the cylinder 38 and the rod 40 have been depicted in FIG. 1 to correspond substantially to the positions of the yoke 28. The cylinder is connected at its pivoted end to an air pressure supply conduit 42 and its opposite end at the piston rod is connected to an air pressure conduit 43. Air supplied at conduit 42 will cause the piston rod 40 to extend to rotate drive gear 24, while air supplied at conduit 43 will retract the rod 40 and return the gear 24 to its home position with the label pickup head 36 at the label supply magazine 16.

During forward rotation of the yoke 28, a vacuum or negative pressure effect needs to be drawn in the head 36 in order for a label L to be sucked off the stack. The vacuum is provided by connecting a vacuum line 44 into the bottom of hollow shaft 27, and to mount a suitable swivel fitting 45 at the top end of that shaft. The fitting 45 supports a conduit 46 which extends into the yoke arm 33, and suitable passages are formed in the arm to communicate the vacuum to head 36. The head 36 has its face 36F formed with a series of parallel slots and lands between slots, and a mask of rubber or similar material secured on the lands, all of which is generally known and not necessary to show. The vacuum effect will draw a label slightly into the slots so that only the strip areas of the label rested on the mask will be in position to receive an application of adhesive or glue.

Figure 3:
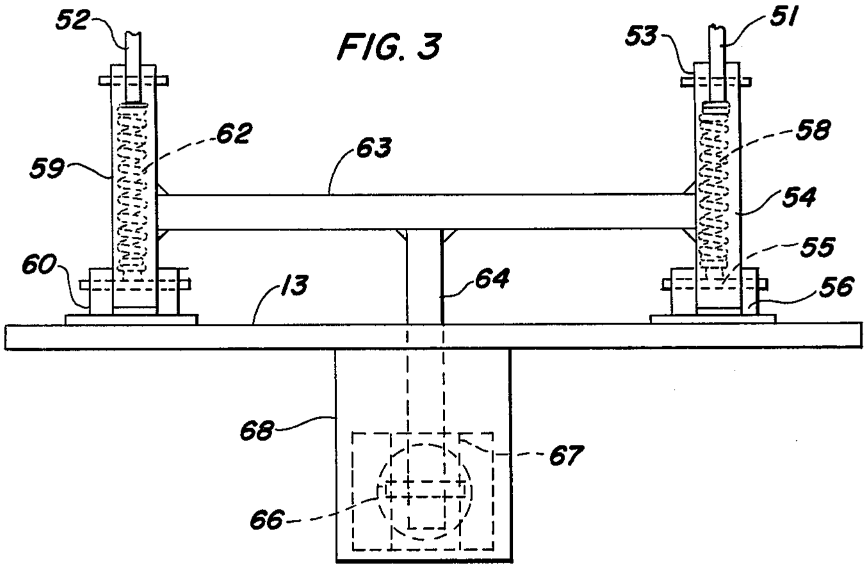
FIG. 3 is a view taken at line 3—3 in FIG. 1 to illustrate certain operating mechanism associated with the adhesive applicator.
Figure 4:
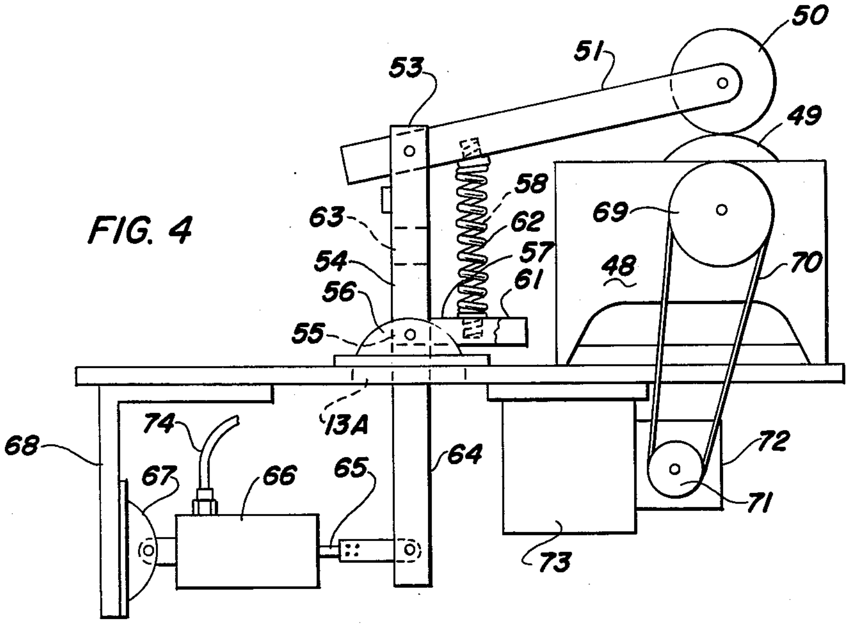
FIG. 4 is a view taken at line 4—4 in FIG. 1 to further illustrate the mechanism associated with the adhesive applicator.

The adhesive or glue supply assembly on platform 13 is seen in FIG. 4, and to some extent in FIGS. 1, 2 and 3. The glue is substantially fluid at room temperature, so does not require heat. Its container 48 is mounted on platform 13 so that the glue pickup roll 49 has a portion of its surface exposed above the container 48. An applicator roll 50 is supported adjacent the roll 49 on a pair of arms 51 and 52 attached at the ends of the roll. Arm 51 is pivoted at the upper end 53 of a lever 54, and the lower end 55 is supported in a clevis 56 fastened to platform 13. The lower end 55 of lever 54 is fixed to a second lever 57 directed at substantially right angles to the lever 54. A suitable spring 58 is positioned between the lever 57 and vertically spaced arm 51. The second arm 52 is similarly pivotally supported at the upper end of lever 59, the lower end of lever 59 being pivoted in a clevis 60 on platform 13. A second lever 61 (seen by breaking off the outer end of lever 57) is substantially at right angles to lever 59 so it is in position to support a suitable spring 62 (behind spring 58) which is positioned between the lever 61 and the arm 52. Both levers 54 and 59 are interconnected by a tie rod 63, and an operating arm 64 extends down through a slot 13A in platform 13 where its lower end is connected to the piston rod 65 of an air cylinder 66. The base of cylinder 66 is pivoted in a support clevis 67 fastened to a bracket 68 attached to the platform 13.

Normally, the glue pickup roll 49 is rotated through a pulley 69 belt connected at 70 to a drive pulley 71 operated from a gear box 72 powered from motor 73 mounted under platform 13. The roll 49 raises the glue and transfers it onto roll 50 which is rotated by contact with roll 49. When the glue from applicator roll 50 is to be applied to a label, the cylinder 66 is energized by air supplied by conduit 74, and the rod 65 is extended so the lever 64 moves counter-clockwise and, due to the tie rod 63 being connected to the levers 54 and 59, swings the vertically directed levers 54 and 59 also in a counter-clockwise direction. This motion of levers 54 and 59 causes the second right angular levers 57 and 61 to move in the same direction, thereby pushing up on the springs 58 and 62 which elevate the arms 51 and 52 to raise applicator roll 50 into the path of movement of the label on pickup head 36. The presence of springs under the arms 51 and 52 makes it possible for the arms to move independently of each other, whereby the roll 50 can cant or tilt by one end being higher or lower than the other end. This is an important feature when it is understood that the label pickup head approaches the roll 50 in an arcuate path so that the portion of the head moving on the inside of the arc of the sweep path makes contact with the near end of roll 50 before the rest of the label surface has moved to engage the roll. The independent movement of arms 51 and 52 will allow the roll 50 to assume the required cant or tilt so that all surfaces of the label supported on the rubber strips of the mask will contact the roll 50 and be applied with glue. The resiliency of the mask on the head 36 will assure that the label can be made to conform to variations in the surface of the case when carton and label meet.

Figure 5:
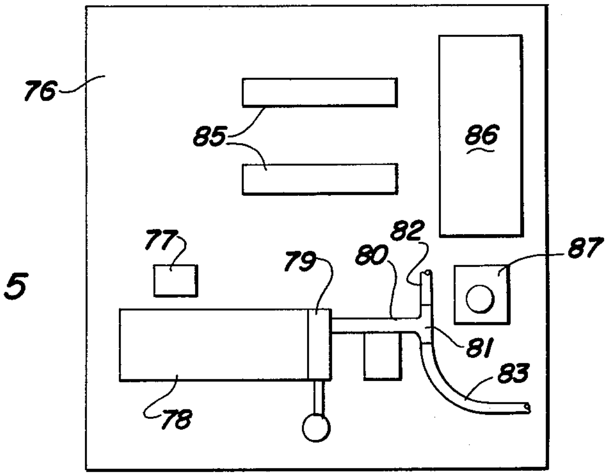
FIG. 5 is a schematic view of the control panel showing certain components for regulating the operation of the case labeler assembly.

In FIG. 2, a control center 15 is shown in the form of a housing supported beneath the platform 11. The housing contains a panel 76 seen in FIGS. 5 and 6 from its opposite sides. In FIG. 5, a power supply (not shown) is connected into the starting capacitor 77 for a motor 78 which operates a vacuum pump 79. The vacuum line 80 from the pump runs to a T fitting 81, one side of which is connected by line 82 to the vacuum conduit 44 seen in FIG. 2, and the other side of which is connected by line 83 to a line continuation 84 to the other side of panel 76 seen in FIG. 6. The panel 76 carries conventional terminal strips 85, and a relay containing box 86. In addition, an alarm device 87 is carried on the panel 76.

Figure 6:
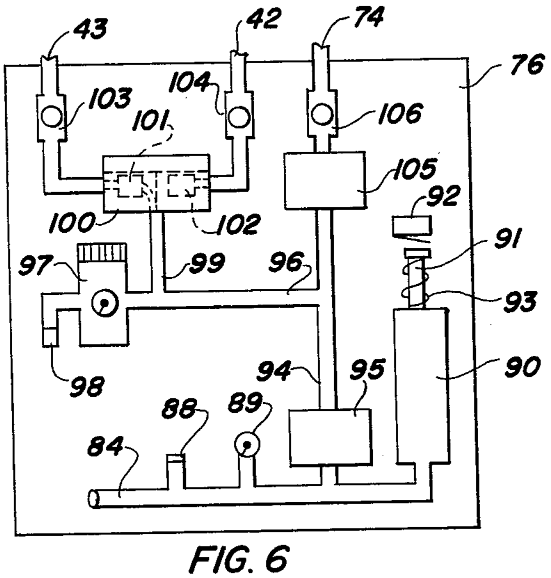
FIG. 6 is a schematic view of the reverse side of the control panel of FIG. 5 showing complementary portions of the control provision.

In FIG. 6, the vacuum line 84 is provided with a vacuum line relief valve 88 and a vacuum gauge 89. A vacuum sensor device 90 is connected into line 84, and the projecting plunger 91 is directed toward a microswitch 92 which is normally closed. If the desired vacuum is not being developed in line 84, the spring 93 will extend plunger 91 to open the circuit contact in microswitch 92. A branch line 94 from line 84 contains a vacuum purge valve 95, as will be explained presently. The line 94 has a first branch 96 which connects into a pressure regulator device 97 of adjustable type for the air inlet 98. The branch line 96 also has a branch line 99 which leads into a valve box 100 housing a first valve 101. The valve 101 is connected to the conduit 43 (FIG. 2). A second valve 102 in the box 100 is connected to the conduit 42 (FIG. 2). These valves 101 and 102 control the retract and extend operation of the cylinder 38 (FIGS. 1 and 2), and control means 103 and 104 are inserted in conduits 43 and 42 for controlling the action of the cylinder 38. Line 94 extends beyond branch 96 directly to a fourth valve 105 which is connected through control means 106 to conduit 74 associated (FIG. 4) with the air cylinder 66 for raising the glue applicator roll 50 when a label is expected to be moved over said roll on its way to be presented, glue side to, to the case moved by conveyor 37. As will appear presently, the valves 95, 101, 102 and 105 are operated by solenoid means between open and closed positions.

OPERATION

The operation of the foregoing described embodiment will be described in relation to the components seen in FIGS. 1, 2, 4 and 7 which show the principal power leads 107 and 108, with the lead 107 subject to a main control switch 109 having an automatic setting as well as a manual setting. For example, with switch 109 in the automatic setting, a green light 110 will illuminate, motor 73 will be energized for rotating the glue pickup roll 49, vacuum motor 78 will be energized for creating vacuum in lines 82, 83 and 84, and a solenoid 113 will energize valve 101 (FIG. 6) to assure the air cylinder 38 being in fully retracted position with the vacuum pickup head 36 at the label magazine 16. At this setting of switch 109, a manual control switch MS will be in normally open position so as not to interfere with automatic sequencing.

With the conveyor 37 operating, cases are moved in properly spaced relation to the labeler assembly 10. The approaching case (not shown) contacts the feeler arm 114 (FIG. 1) on microswitch 115 and closes the normally open contacts. Closing of microswitch 115 energizes relay solenoid 116 through normally closed microswitch 117 located with its feeler arm 118 in the path of a case which has already closed switch 115. The relay 116 closes normally open switch 119 and opens normally closed switch 119A. The closing of switch 119 prepares the solenoid valve 120 in a circuit to the air cylinder 66 for operation, but first the normally open microswitch 121 (FIG. 1) must close, provided also that the operation of the vacuum system does not disturb the normally closed switch 92. It was observed that the relay 116 opened normally closed switch 119A to deenergize solenoid 113, and this allowed the valve 102 to open due to making a circuit from switch 119 through solenoid 123. Thus, the air cylinder 38 extends its piston rod 40 for rotating gear 24 in a clockwise direction to move a timing cam 124 on the gear 24 relative to microswitch 121 to close the contacts and cause the valve 105 (FIG. 6) to open and power air cylinder 66 to elevate the glue applicator roll 50 into the path of the approaching head 36.

The foregoing operational events and sequences will take place provided vacuum is present at the face 36F of the head 36 to pick a label L from the stack in the magazine frame 16. The vacuum required is such that the sensor 90 (FIG. 6) does not open normally closed switch 92. Assuming sufficiency of the vacuum due to the presence of a label over the face 36F of the head 36, the gear train will swing the head 36 in an arc to pass over the applicator roll 50 while the head 36 is simultaneously being rotated into a position face down so the back of the label will be wiped over the roll 50. The roll 50 is, as noted, elevated above the roll 49 where it has acquired a film of glue and is thus ready to apply the glue film to the label. The timing of the raising of the glue applicator roll 50 is determined by the position of the cam 124 on the drive gear 24 which closes normally open switch 121. The gear train will continue swinging the head 36 toward conveyor 37 and simultaneously will rotate the head into a vertical attitude in which the glue side of the label is presented to the moving case. At this time, the case will strike feeler arm 118 on switch 117 and open the circuit to relay 116 while making a circuit to a solenoid 125. The solenoid 125 will actuate valve 95 to purge the vacuum in line 44 to head 36, thereby releasing the label which by that time will have been contacted by the advancing surface of a case. The purging of the head 36 is accompanied by operation of the valves 101 and 102 to cause the air cylinder 38 to reverse and return the head 36 to its home position at the label stack.

Figure 7:
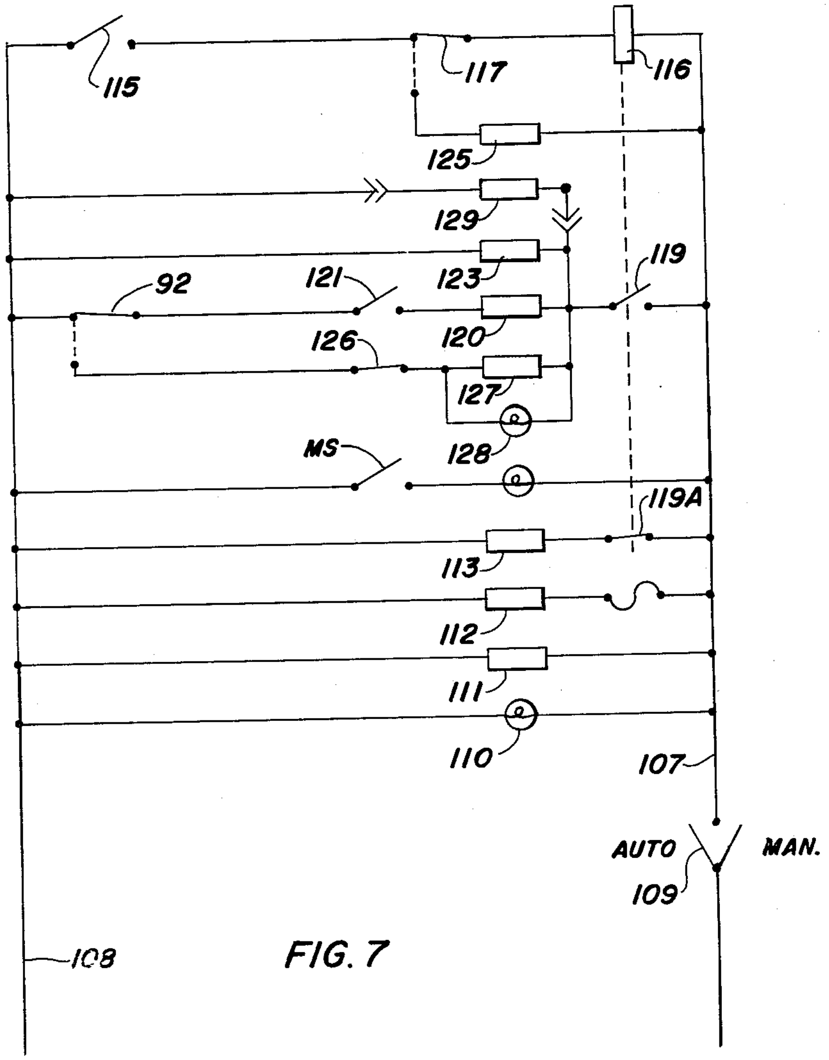
FIG. 7 is a schematic wiring diagram of the several circuits associated with the present labeler.

If it is desired, the circuit of FIG. 7 can be arranged to provide a subcircuit between the closed switch 119 and the vacuum sensing switch 92 through the normally closed switch 126 to energize an audible alarm 127 and illuminate a lamp 128. Also, the system can be arranged with a label counter device 129 which will count each time the switch 119 is closed.

In the event no label is present in the frame 16, the head 36 will have its face 36F uncovered so the vacuum will drop to a value where the sensor 90 will function to open the normally closed switch 92. This lack of vacuum will prevent the lifting of the applicator roll 50 so no glue film can be deposited on the face 36F of the head 36. As seen in FIG. 7, the opening of switch 92 breaks the circuit to switch 121 thereby preventing the solenoid 120 from being energized to operate valve 105 which is in the conduit 74 to air cylinder 66.

The timing of the various actions of the label pickup head 36 and the raising of the glue applicator roll 50 is adjusted by location of the switches 115 and 117 alongside the conveyor 37. This is necessary as cases of different lengths require more or less distance between these switches, as well as the location of switch 117 relative to the position 36L reached by the head 36 (see FIG. 1).

If desirable, the assembly 10 may be made to be portable so it can be brought to a conveyor system which needs a case labeler at a suitable station.

Changes and some variations may be made in the assembly without altering the essential characteristics of the invention described above.

What is claimed is:

1. A case labeler for presenting an adhesive label in the path of movement of a case requiring a label, said labeler comprising: a frame adjacent the path of movement of cases; a label supporting head; a magazine for supporting a supply of labels; adhesive supply means having an applicator member for transferring adhesive from said supply to the labels; operating means connected to said head for moving said head in a path from said magazine and past said applicator member into a position in the path of movement of a case; vacuum generating means connected to said head for permitting said head to engage and pull a label out of said magazine and retain label engagement past said adhesive applicator member and into a position in the path of a case; and control means operatively connected to said operating means and said vacuum generating means and including first means responsive to the approach of a case for energizing said operating means to effect movement of said head between said magazine and a position in the path of case movement, and second means responsive to the advance of a case to the position of said head in the case path for ending the generation of vacuum so the label is released to the case and adhesively secured thereto and causing said operating means to return said head to said magazine.

2. The case labeler set forth in claim 1, wherein said operating means connected to said head includes means for rotating said head from a position presenting a surface to said label magazine through a position presenting the label on said surface to said adhesive applicator member and to a position presenting the label with the adhesive side to the path of case movement, said head rotation extending through substantially 180°.

3. The case labeler set forth in claim 1, wherein said operating means connected to said head includes means substantially simultaneously operable to swing said head in an arc between said label magazine and the path of case movement and to rotate said head during said swing in said arc for presenting the same surface of said head to said label magazine and to the path of case movement.

4. The case labeler set forth in claim 1, wherein said adhesive applicator member is supported on arm means independently movable to permit said applicator member to move in response to the position of the label on said head and assume positions maintaining contact with the surface of a label supported by said head.

5. A case labeler comprising: a label supplying magazine; a conveyor spaced from the magazine for moving cases through a label applying station to present a label receiving surface in a predetermined position; a label carrier movable in a substantially circular path from said magazine where a label is picked-up to said label applying station and returned along the same path to said magazine, said label carrier undergoes a change of position by being rotated during the transit through said circular path to bring the label into a position facing the cases at said label applying station; a source of glue; glue applicator means; and support means for said glue applicator means moving said applicator means between said glue source and a position adjacent the circular path followed by said label carrier to be contacted by and apply glue upon the carried label by the label wiping over said applicator means in the rotation of the label.

6. The case labeler set forth in claim 5, wherein said glue applicator means includes arms independently movable to permit said applicator means to assume positions substantially matching the angular position of approach of the label to said applicator means during the circular path of movement thereof.

7. The case labeler set forth in claim 5, wherein said glue applicator support means includes spaced arms pivotally supporting said applicator means from its opposite ends; means for moving said spaced arms in unison to dispose said applicator means in the path followed by the label on said label carrier; and separate resilient means supporting each of said spaced arms for independent movement so that said applicator means is free to yield to the position of the label on said label carrier and substantially conform to the angular position of the label as it wipes over said applicator means.

* * * * *

UNITED STATES PATENT AND TRADEMARK OFFICE

CERTIFICATE OF CORRECTION

PATENT NO. : 4,289,562

DATED : September 15, 1981

INVENTOR(S) : Sherril H. Chisolm

It is certified that error appears in the above-identified patent and that said Letters Patent are hereby corrected as shown below:

Under References Cited, the first listed reference should be "1,886,231 11/1932" and not "1,006,231 11/1912"

Column 1, line 26 "to June 28, 1977" should be "of June 28, 1977".

Column 2, line 23 "Fig. 1 is in" should be "Fig. 1 in".

Column 4, line 27 "When the glue" should be "When glue".

Signed and Sealed this

*Second* Day of *March 1982*

[SEAL]

*Attest:*

GERALD J. MOSSINGHOFF

*Attesting Officer* *Commissioner of Patents and Trademarks*